(12) United States Patent
Huang et al.

(10) Patent No.: US 11,863,694 B2
(45) Date of Patent: Jan. 2, 2024

(54) MOBILE TERMINAL

(71) Applicant: Huawei Technologies Co., Ltd., Shenzhen (CN)

(72) Inventors: Bo Huang, Shanghai (CN); Weihua Mao, Shanghai (CN); Ren Lv, Shanghai (CN); Jianqing Sheng, Shanghai (CN); Hui Zhang, Shanghai (CN); Wangyi Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 402 days.

(21) Appl. No.: 17/296,834

(22) PCT Filed: Nov. 6, 2019

(86) PCT No.: PCT/CN2019/115880
§ 371 (c)(1),
(2) Date: May 25, 2021

(87) PCT Pub. No.: WO2020/108247
PCT Pub. Date: Jun. 4, 2020

(65) Prior Publication Data
US 2022/0006886 A1    Jan. 6, 2022

(30) Foreign Application Priority Data
Nov. 26, 2018   (CN) .......................... 201811429690.7

(51) Int. Cl.
*H04M 1/02*      (2006.01)
*H04N 5/232*     (2006.01)
(Continued)

(52) U.S. Cl.
CPC ........ *H04M 1/0264* (2013.01); *G06F 1/1686* (2013.01); *H04M 1/0237* (2013.01);
(Continued)

(58) Field of Classification Search
CPC .. G06F 1/1626; G06F 1/1686; H04M 1/0235; H04M 1/0237; H04M 1/0264; H04M 2250/20; H04N 23/51; H04N 23/611
(Continued)

(56) References Cited

U.S. PATENT DOCUMENTS

2005/0014527 A1   1/2005  Chambers et al.
2011/0013076 A1*  1/2011  Ko ........................ H04N 23/51
                                                                  348/E5.026
(Continued)

FOREIGN PATENT DOCUMENTS

CN      107911579 A    4/2018
CN      207530914 U    6/2018
(Continued)

*Primary Examiner* — Tan H Trinh
(74) *Attorney, Agent, or Firm* — Conley Rose, P.C.

(57) ABSTRACT

A mobile terminal includes a display, a back cover, a middle frame, a rotation system, and a drive mechanism. A notch is disposed on a top of the back cover, and the rotation system is located at the notch. The rotation system includes a camera, and an outer surface of the rotation system and the back cover are spliced into an outer surface of the mobile terminal. The drive mechanism is configured to drive the rotation system to rise, fall, and rotate, such that the camera has functions of both a rear-facing camera and a front-facing camera.

20 Claims, 15 Drawing Sheets

(51) Int. Cl.
*H04N 5/225* (2006.01)
*G06F 1/16* (2006.01)
*H04N 23/51* (2023.01)
*H04N 23/611* (2023.01)

(52) U.S. Cl.
CPC .......... *H04N 23/51* (2023.01); *H04N 23/611* (2023.01); *H04M 2250/20* (2013.01)

(58) Field of Classification Search
USPC ..................................................... 455/556.1
See application file for complete search history.

(56) References Cited

U.S. PATENT DOCUMENTS

| | | | |
|---|---|---|---|
| 2019/0250667 A1* | 8/2019 | Fan | H04M 1/0237 |
| 2019/0386696 A1* | 12/2019 | Luo | H04B 1/3888 |
| 2019/0386697 A1* | 12/2019 | Luo | A45C 11/00 |
| 2020/0366772 A1* | 11/2020 | Wu | H04M 1/0266 |
| 2021/0064099 A1* | 3/2021 | Yang | G03B 17/04 |
| 2021/0357003 A1* | 11/2021 | Wen | H04M 1/0264 |
| 2022/0038565 A1* | 2/2022 | Wen | H04N 23/55 |

FOREIGN PATENT DOCUMENTS

| | | |
|---|---|---|
| CN | 207869164 U | 9/2018 |
| CN | 207926665 U | 9/2018 |
| CN | 207965879 U | 10/2018 |
| CN | 207968581 U | 10/2018 |
| CN | 208862945 U | 5/2019 |
| CN | 209299304 U | 8/2019 |
| EP | 1551157 A1 | 7/2005 |
| EP | 3525428 A1 | 8/2019 |
| KR | 20060044223 A | 5/2006 |

* cited by examiner

MOBILE TERMINAL

CROSS-REFERENCE TO RELATED APPLICATIONS

This application is a U.S. National Stage of International Patent Application No. PCT/CN2019/115880 filed on Nov. 6, 2019, which claims priority to Chinese Patent Application No. 201811429690.7 filed on Nov. 26, 2018. Both of the aforementioned applications are hereby incorporated by reference in their entireties.

TECHNICAL FIELD

The present invention relates to a mobile terminal, and in particular, to a mobile terminal with a camera component.

BACKGROUND

There is a trend of developing a mobile terminal with a bezel-less screen. For example, a mobile terminal is a smartphone having a front-facing camera and a rear-facing camera, and the front-facing camera occupies a space outside a screen. In this case, a complete bezel-less screen effect cannot be achieved for the existing mobile terminal. How to achieve a real bezel-less screen of the mobile terminal and ensure a thin design of the mobile terminal is a direction of continuous research and development in the industry.

SUMMARY

Embodiments of this application provide a mobile terminal, to realize a real bezel-less screen and thin design.

According to a first aspect, embodiments of the present invention provide a mobile terminal, including: a display, a back cover, a middle frame, a rotation module, and a drive mechanism. The middle frame includes a fastened part and a movable part, the fastened part is fixedly connected to the display and the back cover, and the movable part is connected to the rotation module; the drive mechanism is disposed between the display and the back cover, a notch is disposed on the top of the back cover, and the rotation module is located at the notch; the rotation module includes a camera, and an outer surface of the rotation module and the back cover are spliced into an outer surface of the mobile terminal; and the drive mechanism is configured to drive the rotation module to rise, fall, and rotate, so that the camera has functions of both a rear-facing camera and a front-facing camera. In a process in which the drive mechanism drives the rotation module to rise and fall, the movable part rises and falls synchronously with the rotation module. When the rotation module is accommodated in the notch, the movable part and the fastened part are spliced into the middle frame.

In this application, the camera is disposed in the rotation module. When the rotation module is located in the notch on the top of the back cover, the camera is used as the rear-facing camera. In this state, the camera is not blocked by the back cover, and there is no need to dispose a camera hole on the back cover. In addition, a housing of the rotation module is directly used as an outer surface of the mobile terminal, and the housing of the rotation module wraps the camera. In this way, a relatively high sealing level can be achieved, the camera is less likely to be contaminated by dust, and a photo is clear. The back cover and the rotation module are spliced into an architecture of the outer surface of the mobile terminal side by side, so that the mobile terminal is more easily thinned. When the rotation module rises, falls, and rotates, the camera may be rotated to a side of the display to serve as the front-facing camera. The mobile terminal does not need to be provided with two cameras, and does not need to reserve a position for the front-facing camera outside a display area of the display. In this way, a complete bezel-less screen is truly realized, in other words, the display area is directly close to a frame of the mobile terminal.

The middle frame is divided into the fastened part and the movable part, so that the movable part rises and falls synchronously with the rotation module. This can ensure that a rise-and-fall part of the rotation module of the mobile terminal has a same width as a main body part of the mobile terminal. The main body part is a part in which the fastened part of the middle frame is located. Such an architecture makes an overall structure of the mobile terminal more balanced, and the drive mechanism can drive the rotation module to smoothly rise and fall.

In an implementation, the mobile terminal further includes a control module. The control module is configured to provide a start signal for the drive mechanism. When the drive mechanism is not started, the rotation module is accommodated in the notch, and the camera is used as the rear-facing camera. When a user needs to use the front-facing camera, the control module sends the start signal to the drive mechanism, so that the drive mechanism drives the rotation module to rise and move out of the notch. Then, the drive mechanism drives the rotation module to rotate, so that the camera rotates to the side of the display. The control module may be disposed on a mainboard in the mobile terminal. The mainboard is disposed inside the back cover. A battery may be further disposed inside the back cover. The battery and the mainboard may be disposed side by side. The drive mechanism is also disposed inside the back cover, the drive mechanism is located near the notch on the top of the back cover, and the battery and the mainboard are located between the drive mechanism and the bottom of the back cover.

In an implementation, the drive mechanism includes a rise-and-fall component and a rotation component. The rise-and-fall component is disposed right below the rotation module. When the control module sends a drive signal to the rise-and-fall component, the rise-and-fall component drives the rotation module to rise and move out of the notch, and the control module sends a drive signal to the rotation component, so that the rotation module located outside the notch rotates, and the camera is enabled to rotate to a side of the display. In this implementation, the rise-and-fall component and the rotation component are electrically connected to the control module separately, to drive a rise-and-fall action and a rotating action separately, so that the control module can operate the rotation module more precisely. The rotation component may rise and fall synchronously with the rotation module, and both are driven by the rise-and-fall component. In this state, the rotation component and the rotation module are connected to one support plate together. In another implementation, the rotation component and the rotation module may also be separately disposed on different supports. The rotation component may be first driven by the control module to rotate the rotation module. In this case, the rotation module rotates inside the notch. After the rotation module rotates, the control module drives the rise-and-fall component to raise the rotation module. In this way, only the rotation module rise.

In an implementation, the rise-and-fall component includes a motor, a fixing bracket, a slider, a guide piece, and an ejecting piece. The fixing bracket is fixedly connected inside the mobile terminal. Specifically, the mobile terminal includes the middle frame, the middle frame includes a support plate stacked between the display and the back cover, the fixing bracket is fixed to the support plate, and the fixing bracket is fixedly connected to the support plate in a manner of screwing, glue dispensing, or welding. The motor is fixed to the fixing bracket, an accommodating space is disposed inside the fixing bracket, the guide piece is fixed in the accommodating space, the slider is located in the accommodating space, the slider fits the guide piece, one end of the ejecting piece is fixed to the slider, the other end of the ejecting piece extends out of the fixing bracket and is configured to drive the rotation module to rise and fall, and the motor is configured to drive the slider to slide relative to the guide piece, so as to drive the ejecting piece to extend out of or retract back to the accommodating space.

Specifically, the guide piece includes a guide rod and a lead screw, the guide rod and the lead screw are respectively located on two sides of the ejecting piece, and the slider is provided with a through-hole for the guide rod to pass through and a threaded hole that fits the lead screw.

In an implementation, the fixing bracket is covered by a dust cover. The dust cover seals the accommodating space. The sealed accommodating space isolates the lead screw and the guide rod from the outside, so that dust cannot enter the accommodating space, thereby avoiding that the lead screw, the guide rod, and the slider are blocked due to dust contamination. Therefore, in this implementation, the dust cover is disposed to provide a smoother rise-and-fall drive, thereby improving user experience. The dust cover may be of a flexible sheet-like structure, for example, a lint free cloth or a dust-proof film, and may be stuck to the fixing bracket in a glue manner to block an opening of the accommodating space. The dust cover may alternatively be a rigid cover structure, and is connected to the fixing bracket in a manner of a buckle. In addition, a sealant may be disposed between the dust cover and the fixing bracket.

In an implementation, the fixing bracket includes a first fixing plate, a second fixing plate, and a connecting plate connected between the first fixing plate and the second fixing plate, two ends of the guide rod and the lead screw are respectively fixed to the first fixing plate and the second fixing plate, the connecting plate includes a pair of side panels, the accommodating space is formed between the pair of side panels, and the motor is mounted to the first fixing plate. Specifically, the second fixing plate is located between the first fixing plate and the rotation module. The ejecting piece can protrude from the second fixing plate to jack up the rotation module.

In an implementation, the rise-and-fall component further includes a buffer device and a support bracket, the support bracket is located between the second fixing plate and the rotation module, the support bracket is configured to support the rotation module, and the buffer device is connected to the support bracket. When the rotation module is accommodated in the notch, the buffer device is located on two sides of the pair of side panels. In a process in which the ejecting piece protrudes from the fixing bracket, the ejecting piece jacks up the support bracket, the buffer device, and the rotation module. When the rotation module is in a raised state, and the mobile terminal is impacted by an external force, because of the existence of the buffer device, the buffer device can be compressed to absorb a part of the impact. In this way, impact on the ejecting piece and the slider can be reduced, thereby buffering and protecting the slider and the ejecting piece.

Specifically, the buffer device includes a first spring, a second spring, a first bracket, and a second bracket. Both the first bracket and the second bracket are fixedly connected to the support bracket. The first bracket and the second bracket are located on a side that is of the support bracket and that is away from the rotation module. An accommodating space is formed between the first bracket and the second bracket. The accommodating space is used to accommodate the fixing bracket. The first spring is connected between the support bracket and the first bracket. The second spring is connected between the support bracket and the second bracket. Specifically, the first bracket and the second bracket may be integrally disposed with the support bracket. In an implementation, the first bracket and the second bracket are L-shaped. The first bracket and the second bracket are disposed in a back-to-back manner. The first bracket and the support bracket form a "⌊⌉" architecture, the second bracket and the support bracket also form a "⌈⌋" architecture, the two "⌊⌉" architectures are disposed in a back-to-back manner, and an accommodating space is formed between the two "⌊⌉" architectures.

In an implementation, the rotation component is connected to the rotation module, and rises and falls synchronously with the rotation module. The rotation component includes a rotating motor and a rotating shaft that are distributed on two opposite sides of the rotation module. The rotation module is connected to the rotation component through the rotating shaft. The rotating motor drives the rotation module to rotate.

In an implementation, a hollow channel is disposed inside the rotating shaft, the hollow channel is used for a cable to pass through, and the cable is electrically connected between the rotation module and the control module.

In an implementation, the rotating motor is electrically connected to the control module through a flexible connecting piece. When the rotation module is accommodated in the notch, the flexible connecting piece is in a bent state.

In an implementation, the mobile terminal further includes a middle frame. The middle frame includes a fastened part and a movable part. The fastened part is fixedly connected to the display and the back cover. The movable part is fixedly connected to the rotation component, and rises and falls synchronously with the rotation component. When the rotation module is accommodated in the notch, the movable part and the fastened part are spliced into the middle frame.

In an implementation, the rotation module further includes a flash component, an audio component, an ambient optical sensor, and an infrared emitting light.

In an implementation, the audio component has a sound pickup function. The camera is electrically connected to the audio component, so that the camera obtains an orientation signal of a photographed person through the audio component. The control module adjusts a direction of the camera by using the orientation signal obtained by the camera.

In an implementation, the rotation module further includes a face tracking and identification module and an eye tracking module, to identify an orientation signal of a photographed person. The control module adjusts a direction of the camera by receiving the orientation signal.

In an implementation, when the rotation module is accommodated in the notch, a gap is maintained between the rotation module and the back cover, an antenna is disposed inside the mobile terminal, and the gap is a radiation path of the antenna.

In an implementation, a radiator of the antenna is disposed on a housing of the rotation module.

In an implementation, the back cover includes a main body and an active part. The active part is located on the top of the main body. The notch is formed on the active part. The active part is configured to rise and fall synchronously with the rotation module. The active part is configured to shield a rotation component of the drive mechanism. In this way, a housing does not need to be disposed for the rotation component, and the active part of the back cover may be used as a housing of the mobile terminal or may be used as a housing of the rotation component. This facilitates the thin design of the mobile terminal.

BRIEF DESCRIPTION OF DRAWINGS

To describe the technical solutions in the embodiments of the present invention or in the background more clearly, the following describes the accompanying drawings for describing the embodiments of the present invention or the background.

DESCRIPTION OF EMBODIMENTS

The following describes the embodiments of the present invention with reference to the accompanying drawings in the embodiments of this application.

Figure 1:
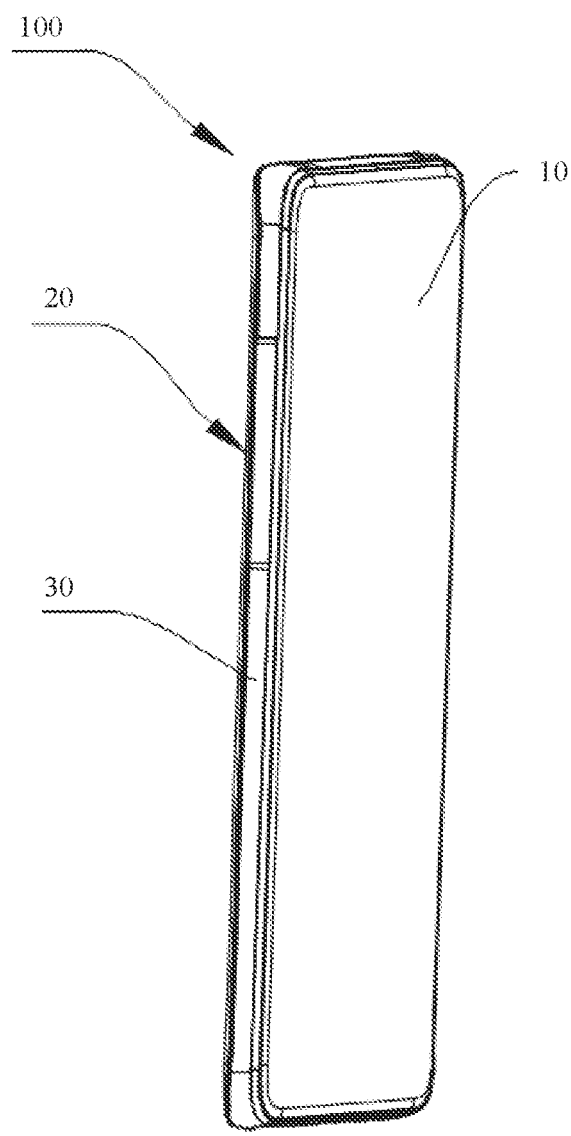
FIG. 1 is a schematic three-dimensional diagram of a first direction of a mobile terminal according to an implementation of this application.
Figure 2:
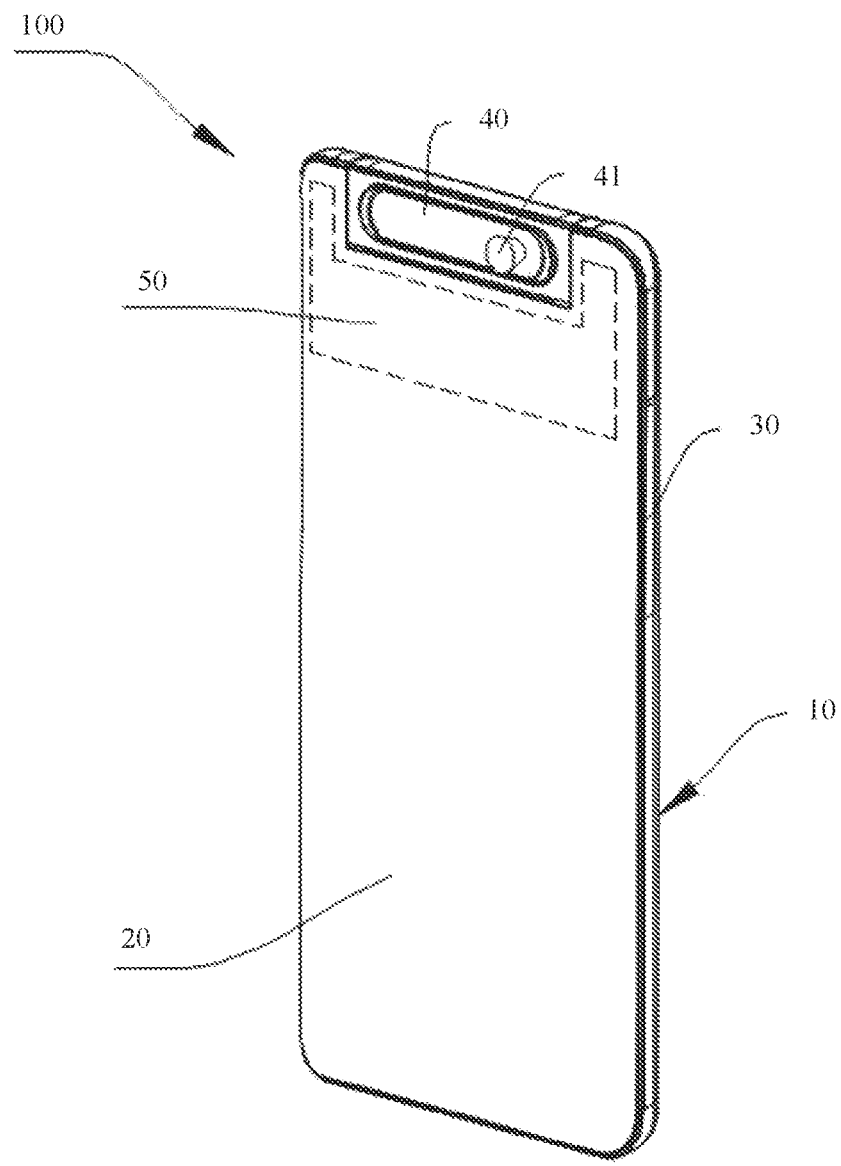
FIG. 2 is a schematic three-dimensional diagram of a second direction of a mobile terminal according to an implementation of this application.
Figure 3:
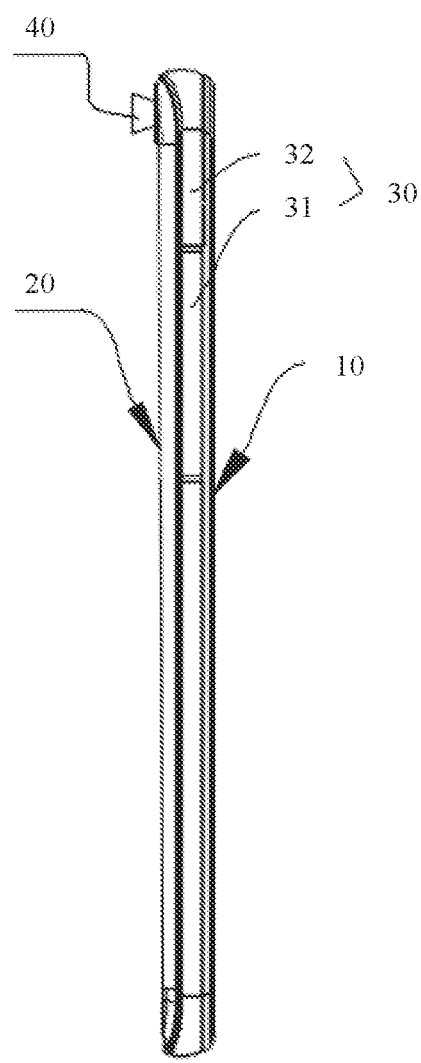
FIG. 3 is a side view of a mobile terminal according to an implementation of this application.
Figure 4:
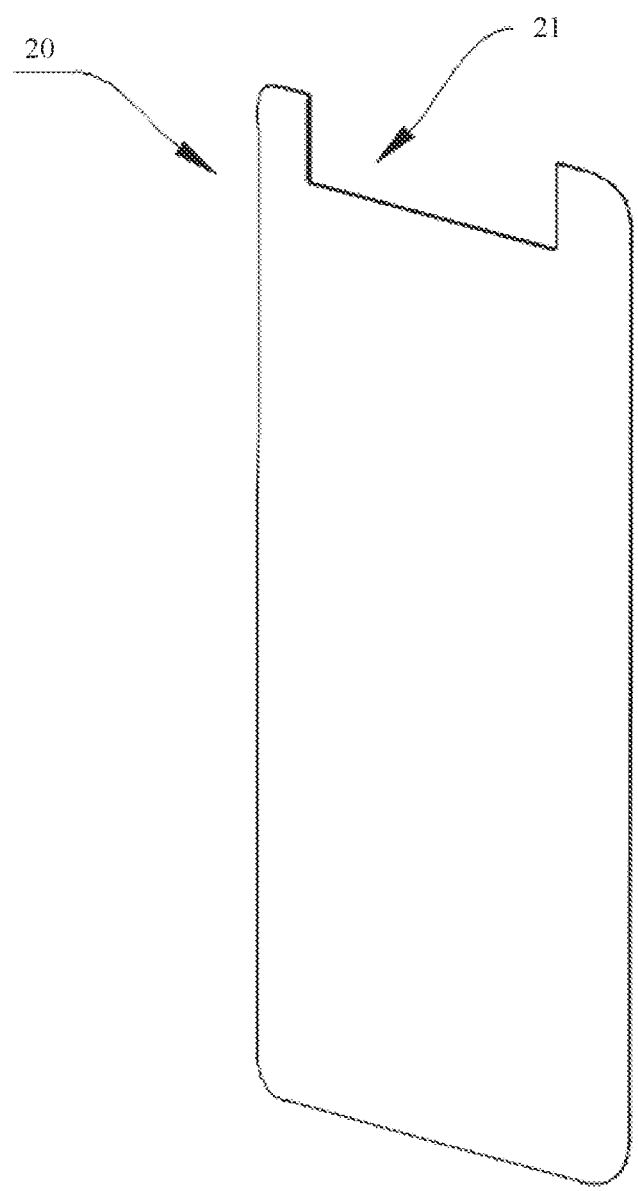
FIG. 4 is a schematic diagram of a back cover of a mobile terminal according to an implementation of this application.

As shown in FIG. 1, FIG. 2, and FIG. 3, the embodiments of this application provide a mobile terminal 100. The mobile terminal 100 may be a terminal device such as a smartphone or a tablet. The mobile terminal 100 includes a display 10 located in the front, a back cover 20 located in the rear, and a middle frame 30 connected between the display 10 and the back cover 20. The display 10 of the mobile terminal 100 provided in this application is a bezel-less screen, in other words, it appears that a large part or an entire part of the display 10 is a display area. The back cover 20 of the mobile terminal 100 provided in this application does not completely cover the back of the mobile terminal. A notch 21 (shown in FIG. 4) is disposed on the top of the back cover 20. The notch 21 may be disposed in a middle area on the top of the back cover 20, to be specific, the top of the back cover 20 includes a U-shaped area. An opening of the notch 21 is opened on the top of the mobile terminal 100.

As shown in FIG. 2, the mobile terminal 100 further includes a rotation module 40 and a drive mechanism 50. The drive mechanism 50 is disposed between the display 10 and the back cover 20. In FIG. 2, the drive mechanism 50 is an area represented by a dashed-line box. The drive mechanism 50 is disposed inside the back cover 20, and may be installed on a middle frame support in the mobile terminal 100. The rotation module 40 is located at the notch 21. The rotation module 40 includes a camera 41. An outer surface of the rotation module 40 and the back cover 20 are spliced into an outer surface of the mobile terminal 100. The drive mechanism 50 is configured to drive the rotation module 40 to rise, fall, and rotate, so that the camera 41 has functions of both a rear-facing camera and a front-facing camera.

Figure 5:
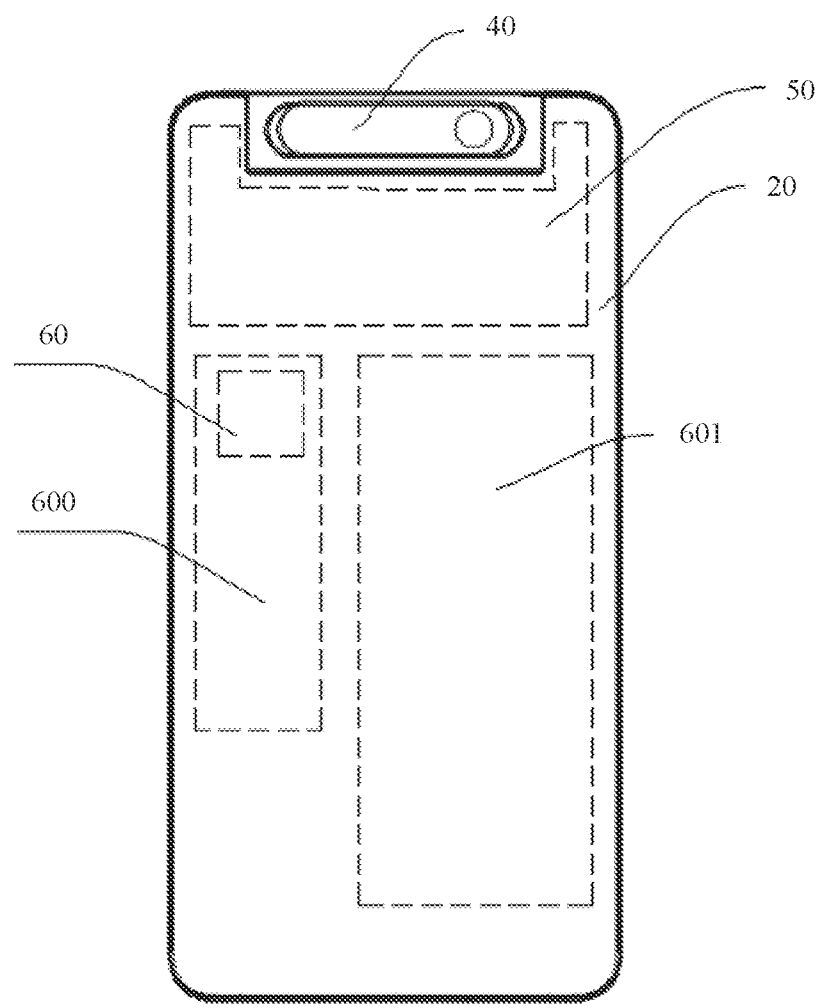
FIG. 5 is a rear view of a mobile terminal according to an implementation of this application, where a rotation module is in an unraised state.
Figure 6:
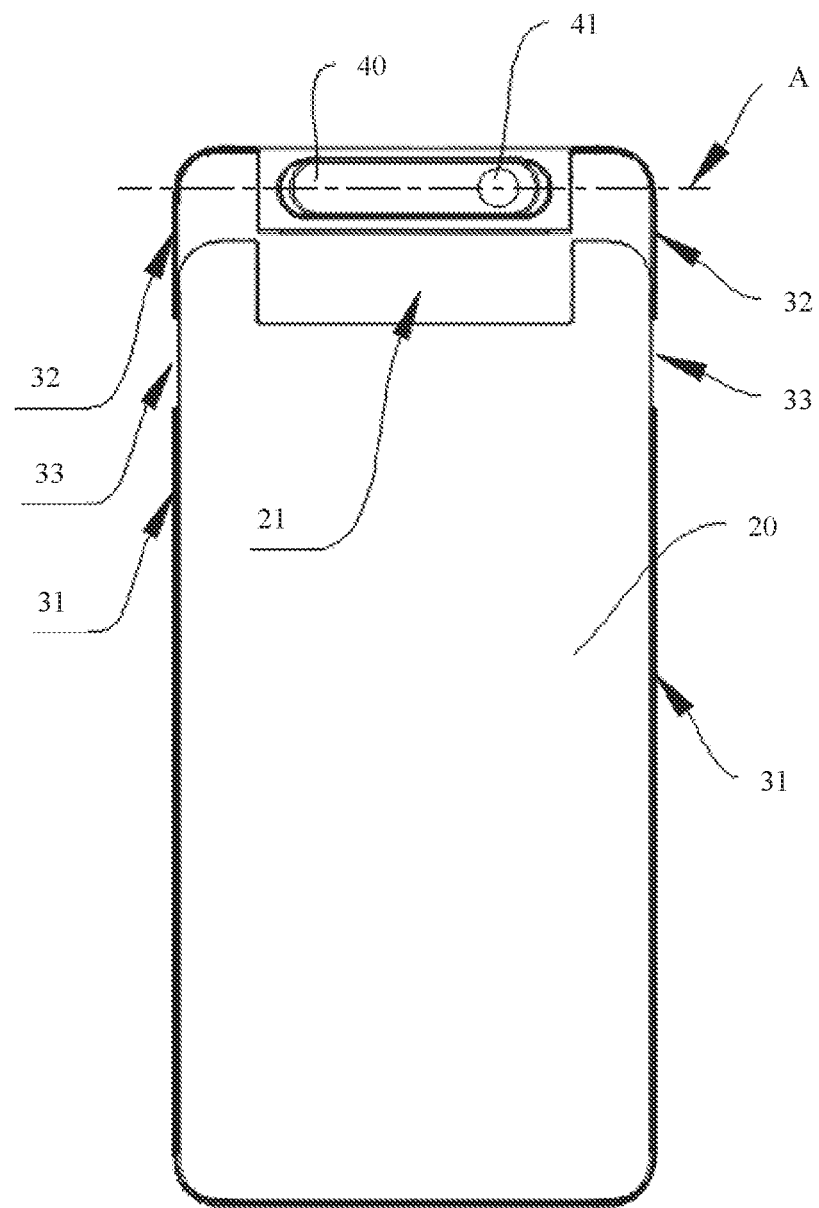
FIG. 6 is a rear view of a mobile terminal according to an implementation of this application, where a rotation module is in a raised state.
Figure 7:
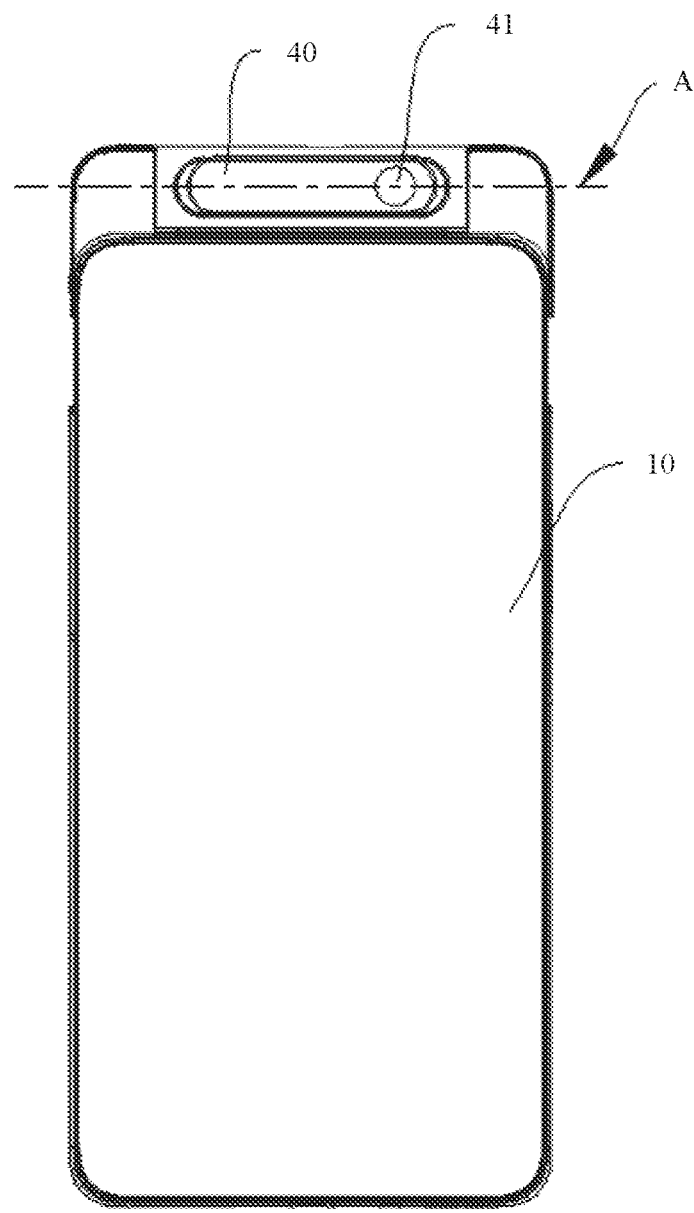
FIG. 7 is a front view of a mobile terminal according to an implementation of this application, where a rotation module is in a state of being raised and rotated to a display side.

As shown in FIG. 5, FIG. 6, and FIG. 7, in this application, the camera 41 is disposed in the rotation module 40. When the rotation module 40 is located in the notch 21 on the top of the back cover 20 (as shown in FIG. 5), the camera 41 is used as the rear-facing camera. In this state, the camera 41 is not blocked by the back cover 20, and there is no need to dispose a camera hole on the back cover 20. In addition, a housing of the rotation module 40 is directly used as an outer surface of the mobile terminal 100, and the housing of the rotation module 40 wraps an internal structure of the camera 41. In this way, a relatively high sealing level can be achieved, the camera 41 is less likely to be contaminated by dust, and a photo is clear. The back cover 20 and the rotation module 40 are spliced into an architecture of the outer surface of the mobile terminal 100 side by side, so that the mobile terminal 100 is more easily thinned. FIG. 6 shows a state in which the drive mechanism 50 raises the rotation module 40. In this case, the rotation module 40 moves to the outside of the notch 21. The drive mechanism 50 can further drive the rotation module 40 to rotate around a rotating shaft A. In an implementation, the rotating shaft A extends along a short-side direction of the mobile terminal 100, and passes through a center of the rotation module 40. After rotation, the camera 41 rotates to a side of the display 10 as shown in FIG. 7. In this case, the camera 41 may be used as the front-facing camera. Specifically, a rotation angle of the camera 41 may be 180 degrees, or may be another angle greater than or less than 180 degrees. The rotation angle of the rotation module 40 may be adjusted based on a specific shooting requirement, in other words, a shooting angle of the camera is adjusted.

Therefore, in this application, the rotation module 40 rises, falls, and rotates, so that the camera 41 can rotate to the side of the display 10 to serve as the front-facing camera. The mobile terminal 100 does not need to be provided with two cameras, and does not need to reserve a position for the front-facing camera outside a display area of the display 10. In this way, a complete bezel-less screen is truly realized, in other words, the display area is directly close to a frame of the mobile terminal 100.

In an implementation, as shown in FIG. 5, the mobile terminal 100 further includes a control module 60. The control module 60 is configured to provide a start signal for the drive mechanism 50. When the drive mechanism 50 is not started, the rotation module 40 is accommodated in the notch 21, and the camera 41 is used as the rear-facing camera. When a user needs to use the front-facing camera, the control module 60 sends the start signal to the drive mechanism 50, so that the drive mechanism 50 drives the rotation module 40 to rise and move out of the notch 41, that is, the state shown in FIG. 6. Then, the drive mechanism 50 drives the rotation module 40 to rotate, so that the camera 41 rotates to the side of the display 10, that is, the state shown in FIG. 7. The control module 60 may be disposed on a mainboard 600 in the mobile terminal 100. The mainboard 600 is disposed inside the back cover 20. A battery 601 may be further disposed inside the back cover 20. The battery 601 and the mainboard 600 may be disposed side by side. The drive mechanism 50 is also disposed inside the back cover 20, the drive mechanism 50 is located near the notch 21 on the top of the back cover 20, and the battery 601 and the mainboard 600 are located between the drive mechanism 50 and the bottom of the back cover 20.

Figure 8:
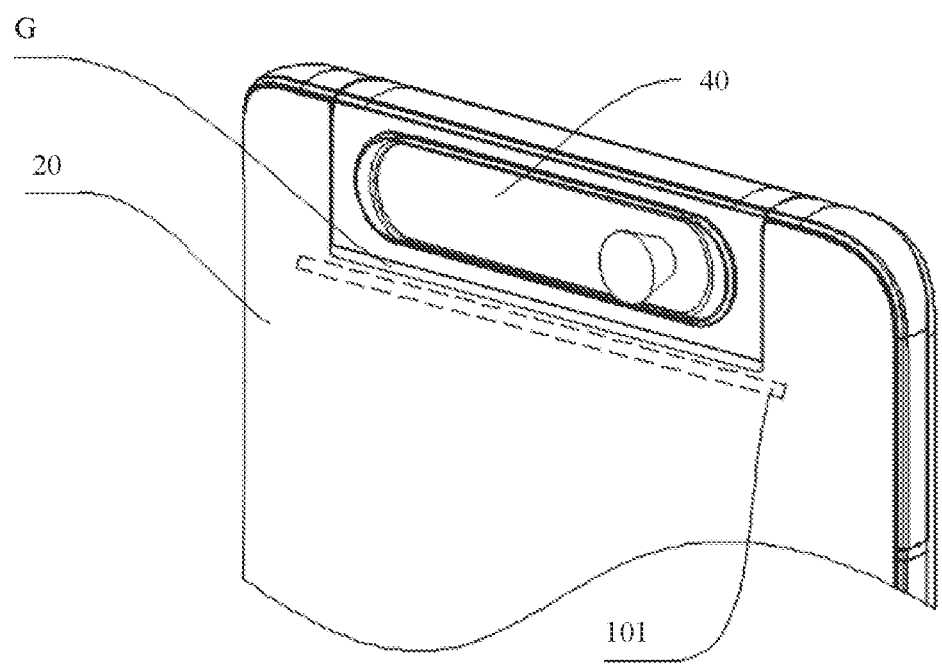
FIG. 8 is a locally enlarged schematic diagram of a joint between a back cover and rotation module of a mobile terminal according to an implementation of this application.

As shown in FIG. 8, in this application, the rotation module 40 is accommodated at the notch 21 on the top of the back cover 20. When the rotation module 40 is accommodated in the notch 21, a gap G is maintained between the rotation module 40 and the back cover 20. For example, the gap G may be 0.15 mm. The gap G between the rotation module 40 and the back cover 20 can be used as a radiation path of an antenna 101 inside the mobile terminal. The antenna 101 is disposed inside the mobile terminal 100 (FIG. 8 schematically shows that the antenna 101 is located inside the back cover 20). To ensure texture of the mobile terminal, the back cover 20 is designed to be made of a metal material. In this way, the antenna 101 in the mobile terminal 100 may be radiated out through the gap G between the rotation module 40 and the back cover 20, and an antenna gap function can be realized by using only a gap G formed at the notch 21 without a need of adding an antenna gap to the back cover. Therefore, in this application, a structure of the notch 21 of the back cover 20 and a structure in which the back cover 20 fits the rotation module 40 are designed to achieve thinning development of the mobile terminal 100, and implement the antenna gap function while simplifying the structure of the back cover 20, so that the mobile terminal 100 has an advantage of low costs. A radiator of the antenna 101 in the mobile terminal 100 may be disposed on an inner surface of the back cover 20, or may be disposed on the housing of the rotation module 40. When the radiator of the antenna 101 is designed on the housing of the rotation module 40, the antenna 101 may be tuned while the rotation module 40 rises, falls, and rotates, so that a function of the antenna 101 is stronger, and a radiation effect is better.

Figure 9:
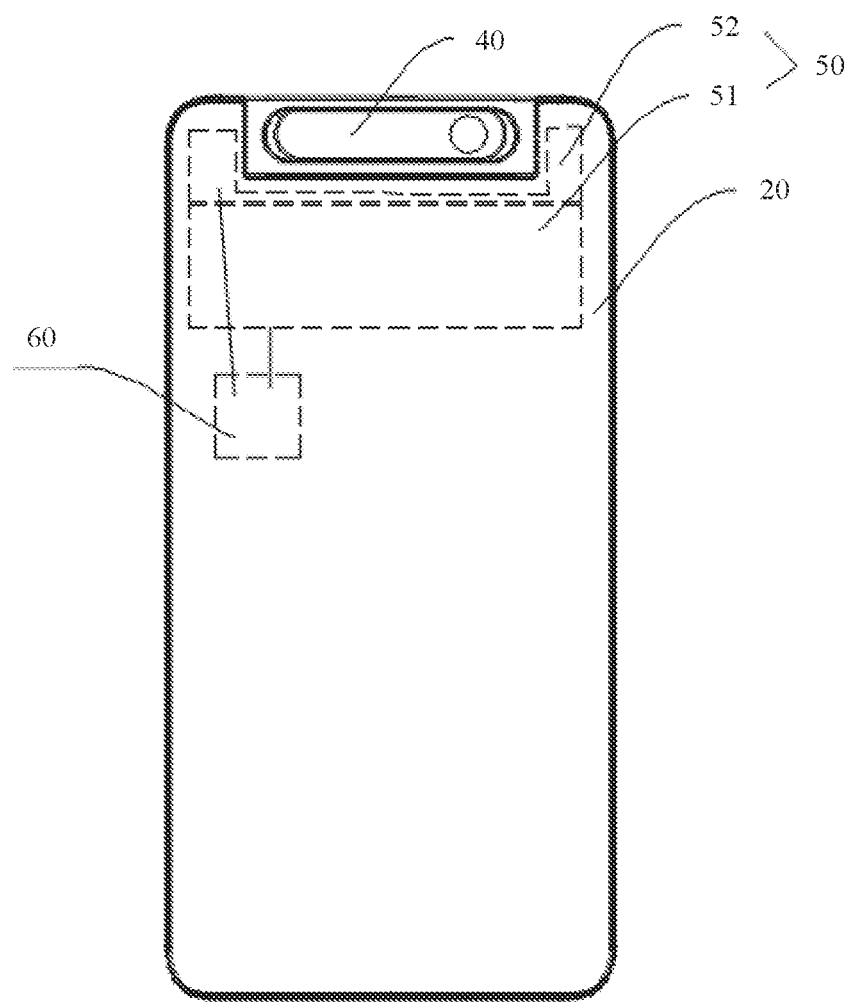
FIG. 9 is a schematic diagram of a mobile terminal according to an implementation of this application, and shows a relationship between a drive mechanism and a control module.

In an implementation, as shown in FIG. 9, the drive mechanism 50 includes a rise-and-fall component 51 and a rotation component 52. When the control module 60 sends a drive signal to the rise-and-fall component 51, the rise-and-fall component 51 drives the rotation module 40 to rise and move out of the notch 21, and the control module 60 sends a drive signal to the rotation component 52, so that the rotation module 41 located outside the notch 21 rotates, and the camera. 41 is enabled to rotate to a side of the display 10. In this implementation, the rise-and-fall component 51 and the rotation component 52 are electrically connected to the control module 60 separately, to drive a rise-and-fall action and a rotating action separately, so that the control module 60 can operate the rotation module 40 more precisely. The rotation component 52 may rise and fall synchronously with the rotation module 40, and both are driven by the rise-and-fall component 51. In this state, the rotation component 52 and the rotation module 40 are connected to one support plate together. In another implementation, the rotation component 52 and the rotation module 40 may also be separately disposed on different supports. The rotation component 52 may be first driven by the control module 60 to work, to rotate the rotation module 40. In this case, the rotation module 40 rotates inside the notch 21. After the rotation module 40 rotates, the control module 60 drives the rise-and-fall component 51 to raise the rotation module 40. In this way, only the rotation module 40 rises.

Figure 10:
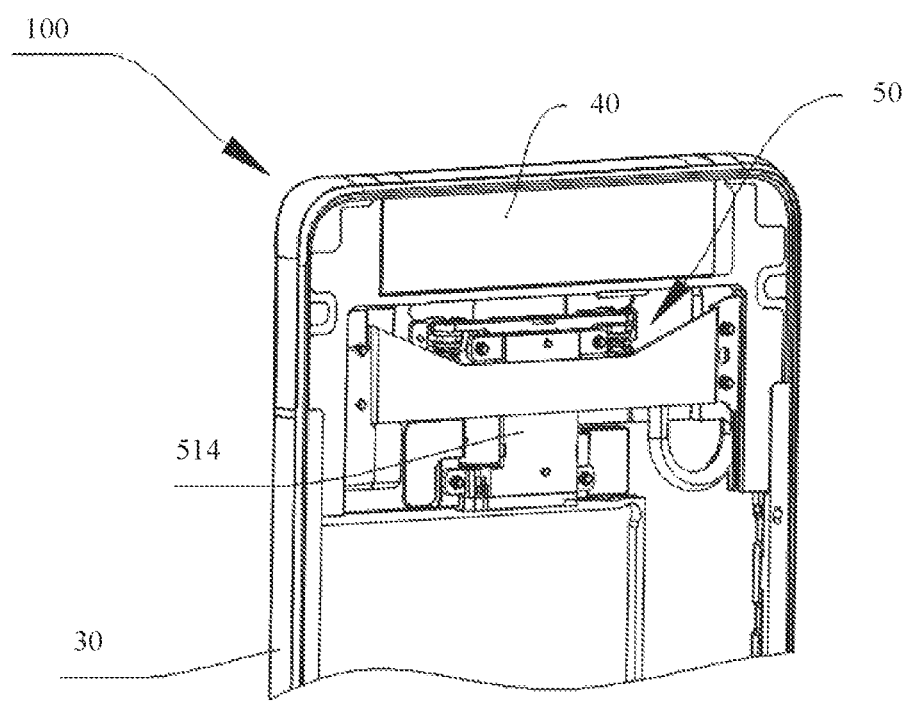
FIG. 10 is a schematic diagram in which a rotation module in a mobile terminal is in an initial state according to an implementation of this application.
Figure 11:
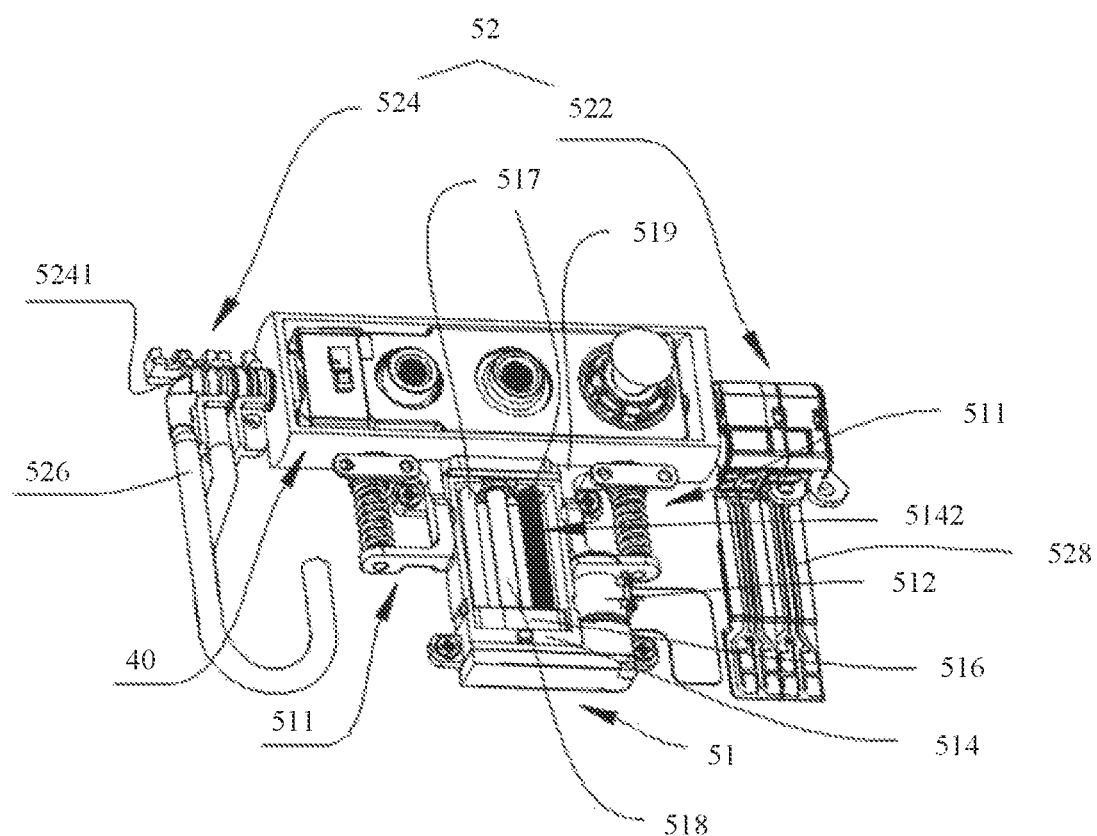
FIG. 11 is a schematic diagram of a rise-and-fall component, a rotation component, and a rotation module of a drive mechanism in a mobile terminal according to an implementation of this application.

FIG. 10 is a schematic diagram in which the rotation module 40 in the mobile terminal is in an initial state, that is, an unraised state according to this application. FIG. 11 is a schematic structural diagram of internal details of the rise-and-fall component 51, the rotation component 52, and the rotation module 40 of the drive mechanism 50 in the mobile terminal shown in FIG. 10. FIG. 10 and FIG. 11 show specific structures from the front and rear directions (that is, a side of the display and a side of the hack cover). In an implementation, the rise-and-fall component 51 is disposed right below the rotation module 40, to enlarge a space inside the mobile terminal, and stress is relatively balanced when the rotation module 40 extends out of or retracts back to the mobile terminal. The rise-and-fall component 51 includes a motor 512, a fixing bracket 514, a slider 516, a guide piece 517, and an ejecting piece 518. The fixing bracket 514 is fixedly connected inside the mobile terminal 100. Specifically, the mobile terminal 100 includes the middle frame 30, and a support plate (to show a structure of the drive mechanism, the support plate is hidden, the support plate is understood as a middle frame support in the mobile terminal, and is configured to install electronic components such as a display, a battery, and a circuit board) stacked between the display 10 and the back cover 20 is disposed in a space enclosed by the middle frame 30. The fixing bracket 514 is fixed on the support plate, and the fixing bracket 514 may be fixedly connected to the support plate in a manner of screwing, glue dispensing, or welding. The motor 512 is fixed to the fixing bracket 514, an accommodating space 5142 is disposed inside the fixing bracket 514, the guide piece 517 is fixed in the accommodating space 5142, the slider 516 is located in the accommodating space 5142, the slider 516 fits the guide piece 517, one end of the ejecting piece 518 is fixed to the slider 516, the other end of the ejecting piece 518 extends out of the fixing bracket 514 and is configured to drive the rotation module 40 to rise and fill, and the motor 512 is configured to drive the slider 516 to slide relative to the guide piece 517, so as to drive the ejecting piece 518 to extend out of or retract back to the accommodating space 5142.

Figure 12:
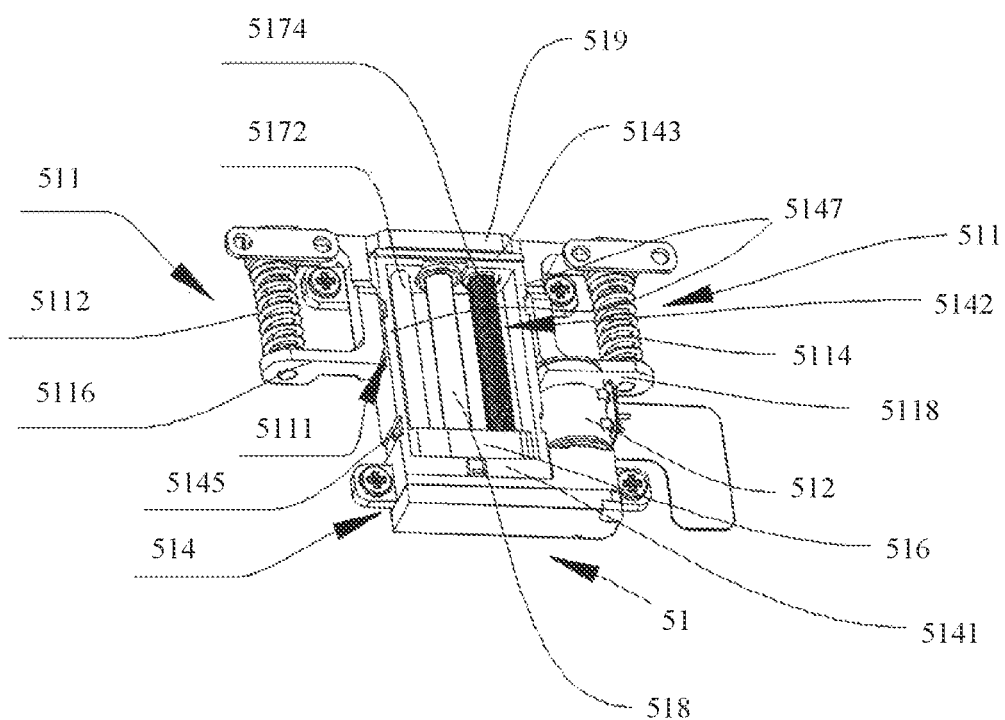
FIG. 12 is a schematic diagram of a rise-and-fall component of a drive mechanism in a mobile terminal according to an implementation of this application.

Specifically, as shown in FIG. 12, the guide piece 517 includes a guide rod 5172 and a lead screw 5174. The guide rod 5172 and the lead screw 5174 are respectively located on two sides of the ejecting piece 518. The slider 516 is provided with a through-hole for the guide rod 5172 to pass through and a threaded hole that fits the lead screw 5174. The slider 516 moves along the lead screw 5174 through screw-thread fit between the slider 516 and the lead screw 5174. The guide rod 5172 and the slider 516 are in smooth fit, and are configured to provide a guide for the slider 516. The guide rod 5172 and the lead screw 5174 are symmetrically distributed on two sides of the ejecting piece 518, providing a smooth oriented architecture for the slider 516 to slide.

In an implementation, the fixing bracket 514 is covered by a dust cover (a structure of the dust cover is not shown in the figure, and it may be understood that the dust cove is a housing, a cover body, or a film-like structure that shields an outer side of the fixing bracket 514, so as to wrap the accommodating space 5142 and form a sealed space). The dust cover seals the accommodating space 5142. The sealed accommodating space 5142 isolates the lead screw 5174 and the guide rod 5172 from the outside, so that dust cannot enter the accommodating space 5174, thereby avoiding that the lead screw 5174, the guide rod 5172, and the slider 518 are blocked due to dust contamination. Therefore, in this implementation, the dust cover is disposed to provide a smoother rise-and-fall drive, thereby improving user experience. The dust cover may be of a flexible sheet-like structure, for example, a lint free cloth or a dust-proof film, and may be stuck to the fixing bracket in a glue manner to block an opening of the accommodating space 5142. The dust cover may alternatively be a rigid cover structure, and is connected to the fixing bracket 514 in a manner of a buckle. In addition, a sealant may be disposed between the dust cover and the fixing bracket 514. As shown in FIG. 12, the fixing bracket 514 includes buckles 5145, there are four buckles 5145 shown in the figure, and two buckles 5145 are respectively disposed on two opposite sides of the fixing bracket 514. In this implementation, the dust cover is a rigid cover structure, the dust cover is fixed to the fixing bracket 514 through fitting between clamping holes on the cover and the buckles 5145.

In an implementation, the fixing bracket 514 includes a first fixing plate 5141, a second fixing plate 5143, and a connecting plate connected between the first fixing plate 5141 and the second fixing plate 5143. Two ends of the guide rod 5172 and the lead screw 5174 are respectively fixed to the first fixing plate 5141 and the second fixing plate 5143. The connecting plate includes a pair of side panels 5147. The accommodating space 5142 is formed between the pair of side panels 5147. The motor 512 is mounted to the first fixing plate 5141. Specifically, the second fixing plate 5143 is located between the first fixing plate 5141 and the rotation module 40. The ejecting piece 518 can protrude from the second fixing plate 5143 to jack up the rotation module 40.

In an implementation, the rise-and-fall component 51 further includes a buffer device 511 and a support bracket 519, the support bracket 519 is located between the second fixing plate 5143 and the rotation module 40, the support bracket 519 is configured to support the rotation module 40, and the buffer device 511 is connected to the support bracket 519. When the rotation module 40 is accommodated in the notch 21, the buffer device 40 is located on two sides of the pair of side panels 5147. In a process in which the ejecting piece 518 protrudes from the fixing bracket 514, the ejecting piece 518 jacks up the support bracket 519, the buffer device 511, and the rotation module 40. When the rotation module 40 is in a raised state, and the mobile terminal 100 is impacted by an external force, because of the existence of the buffer device 511, the buffer device 511 can be compressed to absorb a part of the impact. In this way, impact on the ejecting piece 518 and the slider 516 can be reduced, thereby buffering and protecting the slider 516 and the ejecting piece 518.

Figure 13:
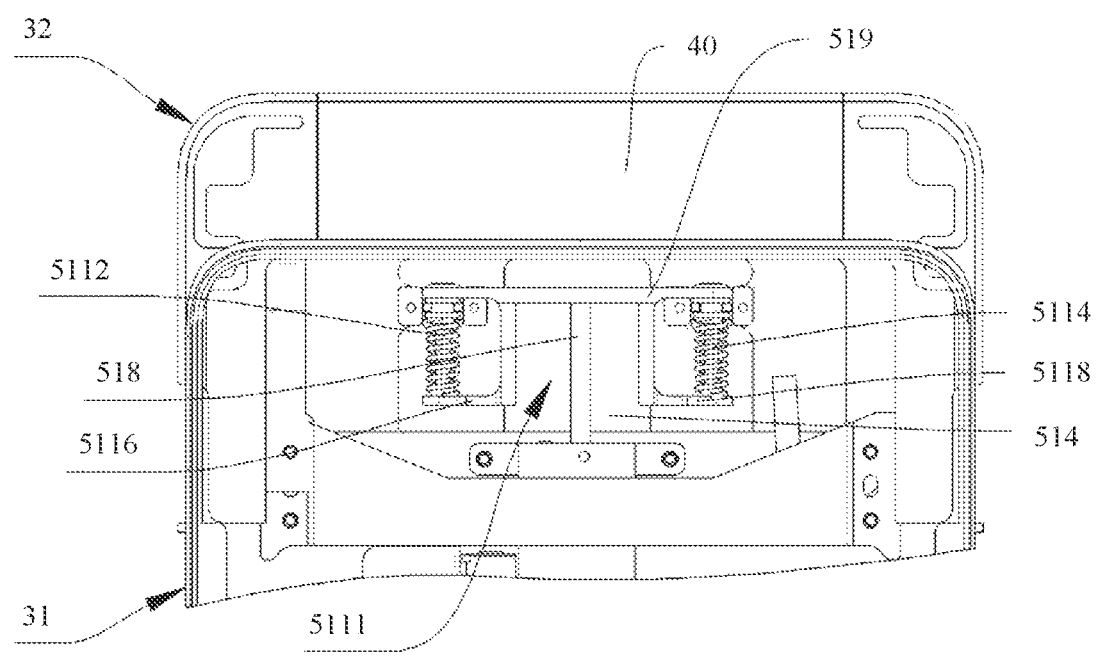
FIG. 13 is a partial schematic diagram of a mobile terminal when a rotation module is in a raised state according to an implementation of this application, and mainly shows a relationship between an ejecting piece, a support bracket, a buffer device, and a fixing bracket.

Specifically, the buffer device 511 is located right below the rotation module 40, to absorb an external impact on the rotation module 40. The buffer device 511 includes a first spring 5112, a second spring 5114, a first bracket 5116, and a second bracket 5118. Both the first bracket 5116 and the second bracket 5118 are fixedly connected to the support bracket 519. The first bracket 5116 and the second bracket 5118 are located on a side that is of the support bracket 519 and that is away from the rotation module 40. An accommodating space 5111 is formed between the first bracket 5116 and the second bracket 5118 (as shown in FIG. 13, a state shown in FIG. 13 is that the rotation module 40 is jacked up by the ejecting piece 518, and in this case, the accommodating space 5111 can be clearly seen). The accommodating space 5111 is used to accommodate the fixing bracket 514. The first spring 5112 is connected between the support bracket 519 and the first bracket 5116. The second spring 5114 is connected between the support bracket 519 and the second bracket 5118. Specifically, the first bracket 5116 and the second bracket 5118 may be integrally disposed with the support bracket 519. In an implementation, the first bracket 5116 and the second bracket 5118 are L-shaped. The first bracket 5116 and the second bracket 5118 are disposed in a back-to-back manner. The first bracket 5116 and the support bracket 519 form a "⌐" architecture, the second bracket 5118 and the support bracket 519 also form a "⌐" architecture, the two "⌐" architectures are disposed in a back-to-back manner, and the accommodating space 5111 is formed between the two "⌐" architectures.

As shown in FIG. 11, in an implementation, the rotation component 52 is connected to the rotation module 40, and rises and falls synchronously with the rotation module 40. The rotation component 52 includes a rotating motor 522 and a rotating shaft 524 that are distributed on two opposite sides of the rotation module 40. The rotation module 40 is connected to the rotation component 52 through the rotating shaft 524. The rotating motor 522 drives the rotation module 40 to rotate.

In an implementation, a hollow channel 5241 is disposed inside the rotating shaft 524, the hollow channel 5241 is used for a cable 526 to pass through, and the cable 526 is electrically connected between the rotation module 40 and the control module 60.

In an implementation, the rotating motor 522 is electrically connected to the control module 60 through a flexible connecting piece 528. When the rotation module 40 is accommodated in the notch 21, the flexible connecting piece 528 is in a bent state. In this way, when the rotation module 40 rises, the bent part of the flexible connecting piece 528 can provide an elongation for a movement stroke of the rotation module.

As shown in FIG. 3, FIG. 6, and FIG. 13, in an implementation, the mobile terminal further includes the middle frame 30. The middle frame 30 includes a fastened part 31 and a movable part 32. The fastened part 31 is fixedly connected to the display 10 and the back cover 20. The movable part 32 is connected to the rotation module 40. In a process in which the drive mechanism 50 drives the rotation module 40 to rise and fall, the movable part 32 rises and falls synchronously with the rotation module 40. When the rotation module 40 is accommodated in the notch, the movable part 32 and the fastened part 31 are spliced into the middle frame 30. The middle flame is divided into the fastened part and the movable part, so that the movable part rises and falls synchronously with the rotation module. This can ensure that a rise-and-fall part of the rotation module of the mobile terminal has a same width as a main body part of the mobile terminal. The main body part is a part in which the fastened part of the middle flame is located. Such an architecture makes an overall structure of the mobile terminal more balanced, and the drive mechanism can drive the rotation module to smoothly rise and fall.

Specifically, the movable part 32 is fixedly connected to the rotation component 52 (as shown in FIG. 13), and rises and falls synchronously with the rotation component 21. When the rotation module 40 rises, the movable part 32 also rises, and the movable part 32 is separated from the fastened part 31. As the state shown in FIG. 6, an interval 33 is formed between the movable part 32 and the fastened part 31. When the rotation module 40 is accommodated in the notch 21, the movable part 32 and the fastened part 31 are spliced into the middle frame 30, in other words, the movable part 32 is in contact with the fastened part 31, and a position of the interval 33 is occupied by the movable part 32, as a state shown in FIG. 3.

In an implementation, the rotation module further includes a flash component, an audio component, an ambient optical sensor, and an infrared emitting light. In this way, elements having a plurality of functions are integrated in the rotation module, facilitating layout of components of the mobile terminal and saving an internal space of the mobile terminal. In particular, there is no need to dispose the flash component, the audio component, the ambient optical sensor, and the infrared emitting light on the display 10 side, thereby improving a screen-to-body ratio and achieving a complete bezel-less screen. Specifically, a circuit board is disposed in the rotation module 40, the flash component, the audio component, the ambient optical sensor, and the infrared emitting light are disposed on the circuit board, and the circuit board is electrically connected to the control module 60 through a cable. The camera in the rotation module 40 may also include different types of cameras such as a main camera, a long-focus camera, and a wide-angle camera.

In an implementation, the audio component has a sound pickup function, and the camera is electrically connected to the audio component, so that the camera obtains an orientation signal of a photographed person through the audio component. The control module 60 adjusts a direction of the camera by using the orientation signal obtained by the camera.

In an implementation, the rotation module further includes a face tracking and identification module and an eye tracking module, to identify an orientation signal of a photographed person. The control module 60 adjusts a direction of the camera by receiving the orientation signal.

In the embodiments shown in FIG. 1 to FIG. 4, the back cover 20 of the mobile terminal is of an integrated structure, and the back cover 20 of the integrated structure covers the drive mechanism 50. When the rotation module 40 and the rotation component 52 of the drive mechanism rises, the rotation component 52 leaves the back cover 20. In this way, an independent housing is required for the rotation component 52.

Figure 14:
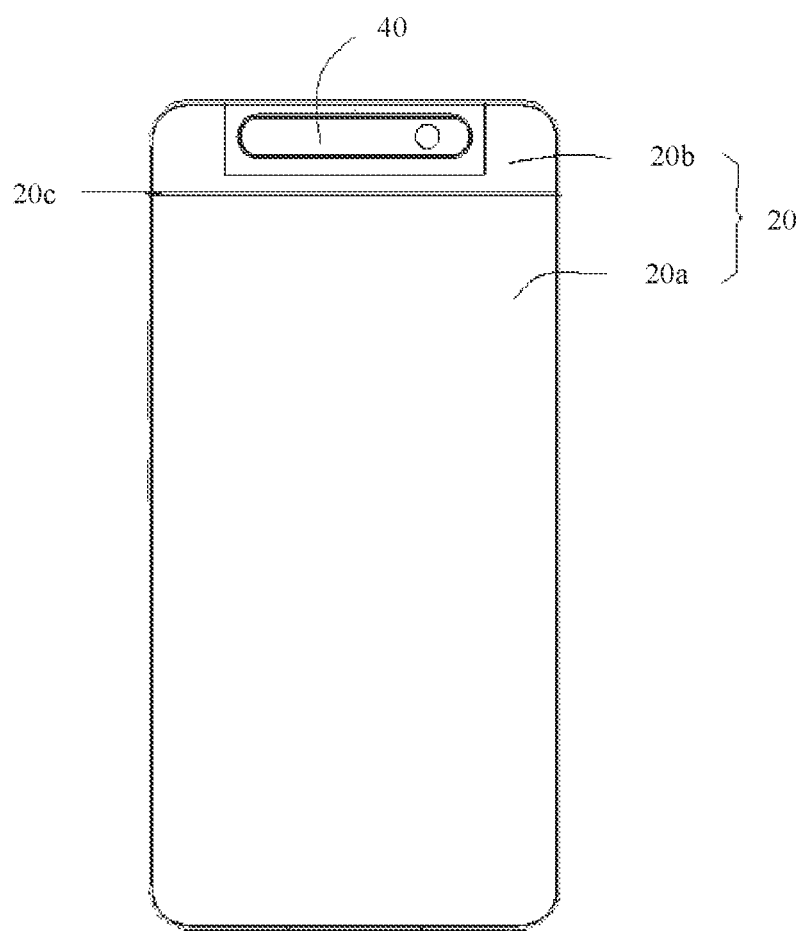
FIG. 14 is a schematic diagram of a mobile terminal according to an implementation of this application, where a rotation module is in an unraised state.
Figure 15:
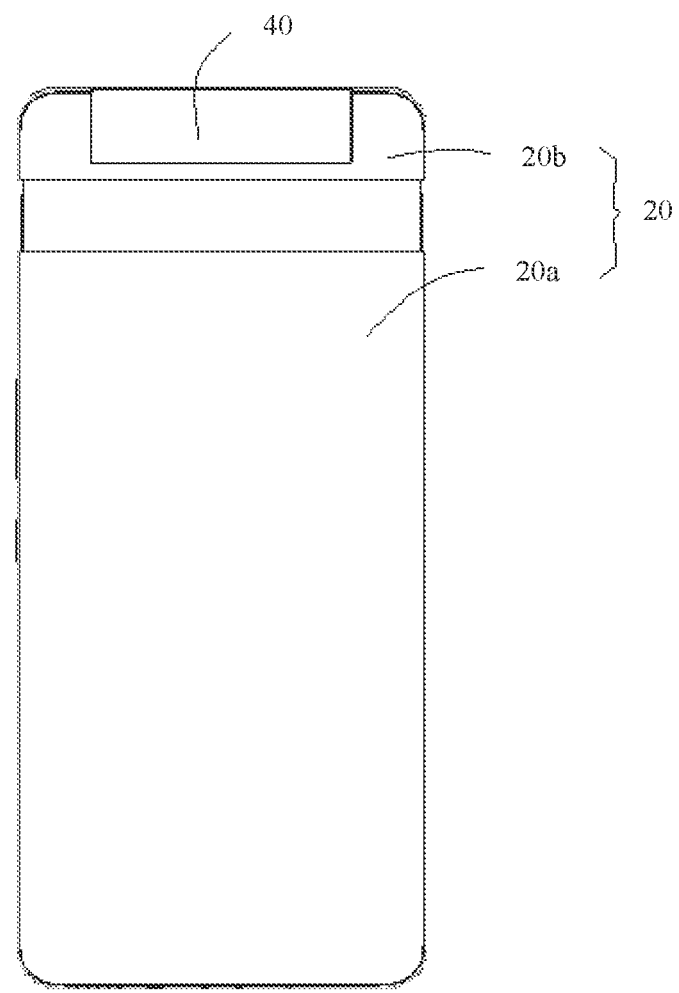
FIG. 15 is a schematic diagram of a mobile terminal according to an implementation of this application, where a rotation module is in a raised state.

In another implementation, the back cover 20 may alternatively be a split-type structure, as shown in FIG. 14 and FIG. 15. In another implementation of this application, the back cover 20 of the mobile terminal includes a main body 20a and an active part 20b, and the active part 20b is located on the top of the main body 20a. The main body 20a covers the circuit board, the battery and the rise-and-fall component 51 of the drive mechanism 50 in the mobile terminal. The active part 20b and the main body 20a are independent elements of each other. The active part 20b covers the rotation component 51 of the drive mechanism 50, and can rise and fail synchronously with the rotation module. In this way, the active part 20b is used as a housing of the rotation component 51, and there is no need to dispose another housing for the rotation component 51. This facilitates a thin design of the terminal. Specifically, the main body 20a is rectangular, the active part 20b is U-shaped, and a notch is disposed on the active part 20b. The notch is equivalent to the notch 21 on the back cover 20 in the embodiments shown in FIG. 1 to FIG. 4, and is used to accommodate the rotation module 40.

As shown in FIG. 14, when the rotation module 40 is in an unraised state, a slot 20c is formed between the main body 20a and the active part 20b of the back cover 20. The slot 20c may be used as a slot antenna. When the back cover 20 is made of metal, the slot 20c can be used as a radiation path of an antenna inside the mobile terminal.

As shown in FIG. 15, when the rotation module 40 rises, the min body 20a of the back cover 20 is separated from the active part 20b, the active part 20b rises synchronously with the rotation module 40, and an element covered by the active part 20b is a rotation component of the drive mechanism 50. FIG. 15 shows an effect obtained after the rotation component drives the rotation module 40 to rotate.

What is claimed is:

1. A mobile terminal comprising:
   a first outer surface;
   a display;
   a back cover comprising a first top;
   a notch disposed on the first top;
   a rotation system located at the notch and comprising:
      a camera electrically configured to obtain an orientation signal of a photographed person; and
      a second outer surface, wherein the second outer surface and the back cover are configured to splice into the first outer surface;
   a middle frame comprising:
      a fastened part fixedly coupled to the display and the back cover; and
      a movable part coupled to the rotation system, wherein the movable part and the fastened part are configured to splice into the middle frame when the rotation system is accommodated in the notch; and
   a drive mechanism disposed between the display and the back cover and configured to drive the rotation system to rise, fall, and rotate to enable the camera to function as a rear-facing camera and a front-facing camera,
   wherein the movable part is configured to rise and fall synchronously with the rotation system when the drive mechanism drives the rotation system to rise and fall.

2. The mobile terminal of claim 1, further comprising a control component coupled to the drive mechanism and configured to provide a start signal for the drive mechanism, wherein when the drive mechanism is not started, the camera is configured as the rear-facing camera and the rotation system is accommodated in the notch.

3. The mobile terminal of claim 2, wherein the drive mechanism comprises:
a rotation component; and
a rise-and-fall component disposed below the rotation system,
wherein the control component is further configured to:
send a first drive signal to the rise-and-fall component; and
send a second drive signal to the rotation component,
wherein the rise-and-fall component is configured to:
receive the first drive signal; and
drive, in response to receiving the first drive signal, the rotation system to rise and move out of the notch, and
wherein the rotation component is configured to:
receive the second drive signal; and
drive, in response to receiving the second drive signal, the rotation system located outside the notch to rotate and to enable the camera to rotate to a side of the display.

4. The mobile terminal of claim 3, wherein the rise-and-fall component comprises:
a fixing bracket fixedly coupled inside the mobile terminal;
an accommodating space disposed inside the fixing bracket;
a guide piece fixed in the accommodating space;
a slider located in the accommodating space and configured to fit the guide piece;
an ejecting piece comprising:
a first end fixed to the slider; and
a second end extending out of the fixing bracket and configured to drive the rotation system to rise and fall; and
a motor fixed to the fixing bracket and configured to drive the slider to slide relative to the guide piece to drive the ejecting piece to extend out of or retract back to the accommodating space.

5. The mobile terminal of claim 4, wherein the guide piece comprises:
a guide rod located on the first end; and
a lead screw located on the second end,
wherein the slider comprises:
a through-hole to pass through the guide rod; and
a threaded hole to fit the lead screw.

6. The mobile terminal of claim 5, further comprising a dust cover configured to:
cover the fixing bracket; and
seal the accommodating space.

7. The mobile terminal of claim 5, wherein the fixing bracket comprises:
a first fixing plate, wherein the motor is mounted to the first fixing plate;
a second fixing plate; and
a connecting plate coupled between the first fixing plate and the second fixing plate and comprising a pair of side panels, wherein the accommodating space is formed between the pair of side panels,
wherein the guide rod comprises:
a third end fixed to the first fixing plate; and
a fourth end fixed to the second fixing plate, and
wherein the lead screw comprises:
a fifth end fixed to the first fixing plate; and
a sixth end fixed to the second fixing plate.

8. The mobile terminal of claim 7, wherein the rise-and-fall component further comprises:
a support bracket located between the second fixing plate and the rotation system and configured to support the rotation system; and
a buffer device coupled to the support bracket, wherein the buffer device is located on two sides of the pair of side panels when the rotation system is accommodated in the notch,
wherein the ejecting piece is configured to raise the support bracket, the buffer device, and the rotation system when the ejecting piece protrudes from the fixing bracket.

9. The mobile terminal of claim 8, wherein the buffer device comprises:
a first bracket fixedly coupled to the support bracket and located on a first side of the support bracket that faces away from the rotation system;
a second bracket fixedly coupled to the support bracket and located on the first side;
a second accommodating space formed between the first bracket and the second bracket and configured to accommodate the fixing bracket;
a first spring coupled between the support bracket and the first bracket; and
a second spring coupled between the support bracket and the second bracket.

10. The mobile terminal of claim 3, wherein the rotation component comprises a rotating motor and a rotating shaft that are distributed on two opposite sides of the rotation system, wherein the rotation component is coupled to the rotation system through the rotating shaft and configured to rise and fall synchronously with the rotation system, and wherein the rotating motor is configured to drive the rotation system to rotate.

11. The mobile terminal of claim 10, further comprising a hollow channel disposed inside the rotating shaft and configured to pass through a cable that is electrically coupled between the rotation system and the control component.

12. The mobile terminal of claim 10, wherein the rotating motor is electrically coupled to the control component through a flexible connecting piece, and wherein the flexible connecting piece is in a bent state when the rotation system is accommodated in the notch.

13. The mobile terminal of claim 10, wherein the movable part is fixedly coupled to the rotation component and configured to rise and fall synchronously with the rotation component.

14. The mobile terminal of claim 2, wherein the rotation system further comprises a flash component, an audio component, an ambient optical sensor, and an infrared emitting light.

15. The mobile terminal of claim 2, wherein the audio component has a sound pickup function, wherein the camera is electrically connected to the audio component, so that the camera obtains an orientation signal of a photographed person through the audio component, and wherein the control component is further configured to adjust a direction of the camera using the orientation signal.

16. The mobile terminal of claim 2, wherein the rotation system further comprises a face tracking and identification component and an eye tracking component, wherein the face tracking and identification component and the eye tracking component are configured to identify the orientation signal, and wherein the control component is further configured to:
receive the orientation signal; and
adjust a direction of the camera using the orientation signal.

17. The mobile terminal of claim 2, further comprising:
a gap maintained between the rotation system and the back cover when the rotation system is accommodated in the notch; and
an antenna disposed inside the mobile terminal, wherein the gap is a radiation path of the antenna.

18. The mobile terminal of claim 17, wherein a radiator of the antenna is disposed on a housing of the rotation system.

19. The mobile terminal of claim 1, wherein the back cover comprises:
a main body comprising a second top; and
an active part located on the second top and configured to rise and fall synchronously with the rotation system, wherein the notch is formed on the active part.

20. The mobile terminal of claim 1, wherein the back cover is further configured to dispose a batter.

* * * * *